United States Patent

[11] 3,590,417

| [72] | Inventor | Giovanni Emanuel<br>Turin, Italy |
|---|---|---|
| [21] | Appl. No. | 867,813 |
| [22] | Filed | Oct. 20, 1969 |
| [45] | Patented | July 6, 1971 |
| [73] | Assignee | Societa Per Azioni Emanuel<br>Turin, Italy |
| [32] | Priority | Oct. 29, 1968 |
| [33] | | Italy |
| [31] | | 53668 A/68 |

[54] WASHING AND DRYING PLANT FOR MOTOR VEHICLES
10 Claims, 8 Drawing Figs.

[52] U.S. Cl.................................................. 15/302, 15/21
[51] Int. Cl..................................................... B60s 3/06

[50] Field of Search.......................................... 15/DIG. 2; 134/123; 15/302, 53

[56] References Cited
UNITED STATES PATENTS

| 2,896,644 | 7/1959 | Emanuel........................ | 134/123 X |
| 3,339,565 | 9/1967 | Williams......................... | 134/123 X |
| 3,431,580 | 3/1969 | Cirino et al..................... | 15/302 |
| 3,451,094 | 6/1969 | Kywi.............................. | 15/302 |

Primary Examiner—William I. Price
Attorney—Sughrue, Rothwell, Mion, Zinn & Macpeak ABSTRACT: An automatic washing and drying plant for vehicle bodies has separate washing and drying units movable along a common guide track spanning the vehicle-receiving area, the movements and operation of the units being controlled in a predetermined sequence to effect washing and drying of a vehicle without the latter having to be moved.

PATENTED JUL 6 1971

Fig_2
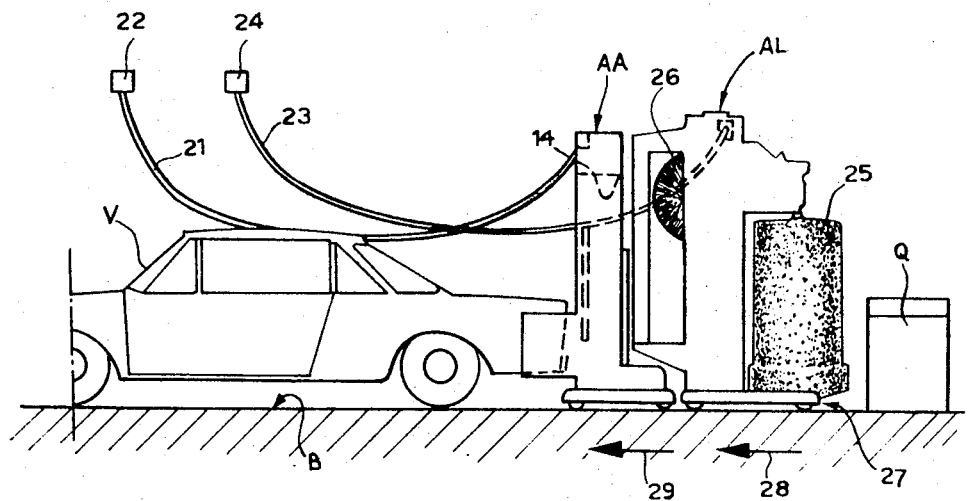
Fig_3
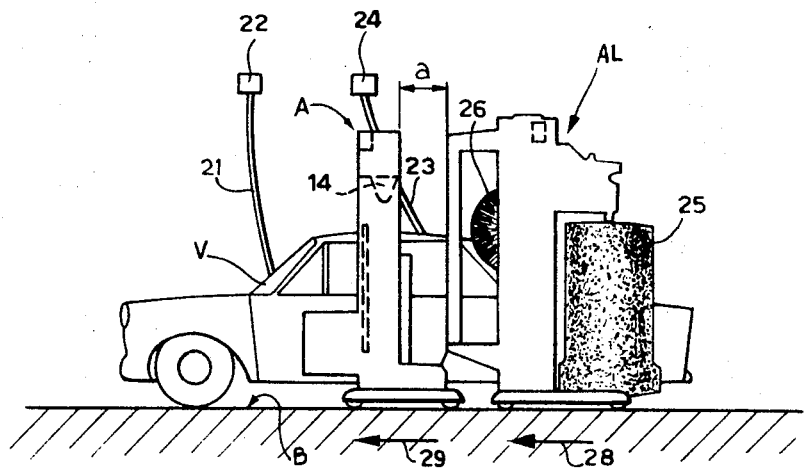

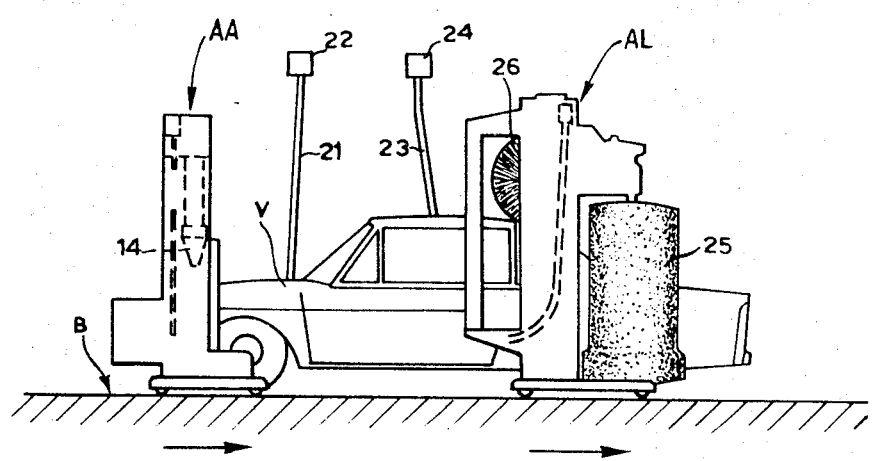
Fig_6
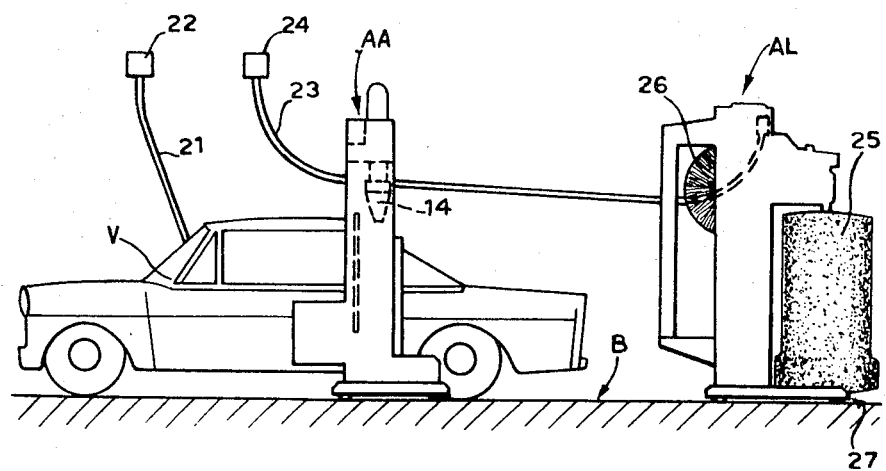
Fig_7

WASHING AND DRYING PLANT FOR MOTOR VEHICLES

This invention relates to washing and drying plant for motor vehicles.

Plant for the automatic washing of motor vehicles are known, which comprise a mobile washing unit in the form of a portal structure or so-called washing arc movable over a track formed by a pair of rails arranged on opposite sides of a space to be occupied by a vehicle being washed, the portal structure or washing arc being adapted to span successive parts of the vehicle body upon movement relative thereto.

The washing unit is generally provided with a pair of rotatable brushes arranged with vertical axes of rotation and having a variable separation, adapted to act mainly on the sides of the vehicle body. In addition the washing unit is provided with a rotary horizontal brush adjustable in height and adapted to act on the end portions and on the roof of the vehicle body. The washing unit is further equipped with devices for spraying against the vehicle body jets of pure water, or water admixed with detergents or other ingredients, upon successive movements of the unit in opposite directions over the track.

Automatic units are also known for drying washed and wet vehicles, comprising a so-called drying arc in the form of a portal structure movable over a track comprising a pair of guide rails arranged on opposite sides of a space to be occupied by the vehicle to be dried.

Such drying units are commonly equipped with powerful fans which direct strong air currents against the surfaces of the sides and top of the vehicle body after the latter has been washed. The drying unit includes outlets for blowing air downwardly against the top surfaces of the vehicle body, these outlets being adjustable in height relative to the vehicle body. Vertical displacements of these outlets may be effected automatically in response to a feeler conveniently arranged on the structure carrying the outlets so as to follow the shape of the top surface of the vehicle body as the drying unit traverses the body.

In existing plant for washing and drying motor vehicles no automatic correlation is provided between the operation of washing and drying units: the drying unit is usually located at a place remote from that at which the washing unit operates. This results in a considerable clumsiness of the overall plant and adversely affects the economy of its operation, since each unit has to be individually operated and supervised by different operators or, if one operator only is in attendance, his attention has to be divided between the two units.

An object of the present invention is to provide a combined washing and drying plant for motor vehicles, which avoids the above-mentioned drawbacks, which is simple and inexpensive in construction, and which is easily controllable in operation.

The invention accordingly provides a washing and drying plant for motor vehicles characterized by comprising a washing unit and a drying unit movable along a common guide track comprising a pair of rails arranged on opposite sides of a space for receiving a vehicle body to be cleaned, and control means for controlling movements of the washing and drying units along said track and the operation of said units to effect washing and drying respectively, in a predetermined sequence.

The control means are preferably so arranged that the drying unit follows the movement of the washing unit during part at least of the movement of the latter, operation of the drying unit being started automatically after the washing unit has traversed a certain length of the vehicle-receiving space.

According to a preferred embodiment of the invention the drying unit starts its motion from a position adjacent the washing unit and starts its forward stroke with a slight advance over the washing unit.

The speed at which the drying unit performs its forward and return strokes respectively away from and towards its starting position may be such that the drying unit is constantly spaced from the washing unit. This important during the return stroke of the latter in order to allow time for the washing water to flow from the surface of the car body.

Further characteristic features and advantages of the invention will be apparent from the following description, given by way of example, with reference to a preferred embodiment illustrated in the accompanying drawings, wherein:

FIGS. 2 to 7 are diagrammatic side elevational views showing a plant according to the invention in various stages of its operational cycle.

Figure 1:
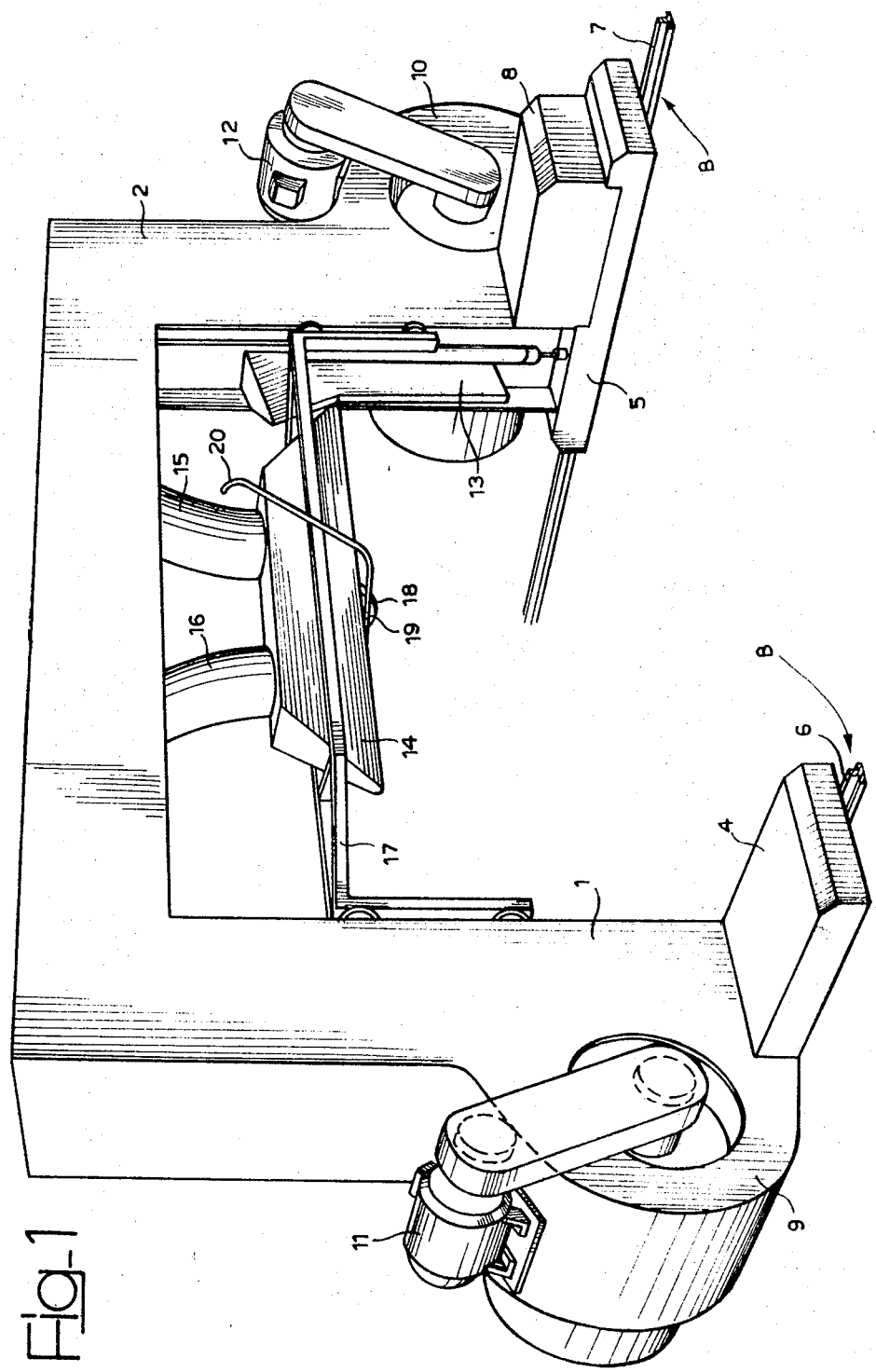
FIG. 1 is a perspective view showing the drying unit employed in the vehicle washing and drying plant according to said embodiment of the invention.

The drying unit shown in FIG. 1 comprises two lateral vertical standards 1, 2 and a horizontal cross member 3 forming with the standards 1, 2 a portal structure or drying arc. The standards 1 and 2 rest on respective carriages 4, 5 each movable along respective parallel rails 6, 7 of a guide track B, through the interposition of wheels, not shown. The carriage 5 is mechanically driven by a motor-reduction gear unit housed in a casing 8.

The standards 1 and 2 support externally at their lower ends respective fans 9, 10 driven by respective motors 11, 12. The fans 9, 10 draw in air and direct it through conduits included within the standards 1, 2 and the cross member 2, which are of hollow box section construction, to lateral vertical outlet slots 13, one only of which is visible in FIG. 1, carried by the standards 1, 2, and an upper horizontal outlet slot 14 carried by the cross member 3. Respective flexible hoses 15, 16 conduct air from the fans 10, 9 respectively to the outlet slot 14.

The horizontal outlet slot 14, the opening of which is directed downwardly, is carried by an inverted U-shaped support structure 17 having vertical side arms which are mounted for displacement along vertical guides, not shown, secured to the inwardly facing surfaces of the standards 1, 2 for effecting vertical adjustment of the height of the horizontal outlet slot 14. The support structure 17 carries a feeler 18 which is operatively associated with a microswitch 19 connected by a cable 20 (part only of which is shown in FIG. 1) with a control unit (not shown) which controls the operation of a servomotor, not shown, for effecting upward movement of the support structure 17 together with the outlet slot 14 when the feeler 18 contacts with a predetermined pressure the upper surface of the body of a vehicle (not shown) located between the rails 6, 7.

In the combined washing and drying plant according to the invention is shown in FIGS. 2 to 7: a drying unit of the kind previously described with reference to FIG. 1 and denoted generally by AA is mounted for traversing movement along the horizontal guide track B which also guides the traversing movement of a washing unit denoted generally by AL.

Electrical power for operating the drying unit AA is supplied by a cable 21 from an electrical plug and socket 22, and the washing unit AL is supplied with both electrical power and water by way of a composite conduit 23 connected to a combined electrical plug and socket and to a water tap 24.

The washing unit AL is of known type having a pair of lateral brushes 25 (one only shown in FIGS. 2 to 7) rotatable about vertical axes the separation of which is adjustable to suit vehicle bodies of different widths. The unit AL further includes an upper brush 26 which is rotatable about a vertical axis and is adjustable in height. Additionally the washing unit AL is provided with arcuate pipes supplied with pure water, or water admixed with detergents or polishes for the vehicle body, communicating with nozzles adapted to direct water jets against the surface of the vehicle body being washed.

The washing unit AL, which may be provided with hydraulic and pneumatic actuators of known type, is controlled during automatic operation of the plant from an electrical control console indicated diagrammatically at Q. The washing unit is of known type and may, for example, be of the type which is marketed by applicants under the trade name "Automec."

Referring to FIGS. 2 to 7 the plant operates as follows.

In the inoperative condition of the plant the washing unit AL and the drying unit AA are in their respective initial positions shown in FIG. 2. The washing unit AL is stationary against a limit stop 27 at the right-hand end of the track B (as viewed in FIG. 2) and the drying unit AA is close to the washing unit AL. The horizontal brush 26 of the washing unit AL and the horizontal outlet slot 14 of the drying unit AA are in their uppermost positions.

On starting the automatic operational cycle of operation of the plant the horizontal brush 26 of the washing unit AL is lowered and the vertical brushes 25 are drawn together to positions to suit the dimensions of the vehicle body V. The two units AL, AA are then advanced from their initial positions (FIG. 2) in the direction of the vehicle body V to be washed and dried, as indicated by the arrows 28 and 29 respectively in FIG. 2.

Forward movement of the drying unit AA is started in advance of the washing unit AL in order to space the two units by a predetermined distance a (FIG. 3).

During this forward movement of the units AL, AA the drying unit AA is inoperative, that is, its fans 9, 10 are not driven and its horizontal outlet slot 14 is maintained in its uppermost position. In the meantime, however, the washing unit AL is operative, its brushes 25, 26 rotating and cleaning the surfaces of the vehicle body V, to which surfaces water admixed with shampoo and rinsing water is delivered.

Figure 4:
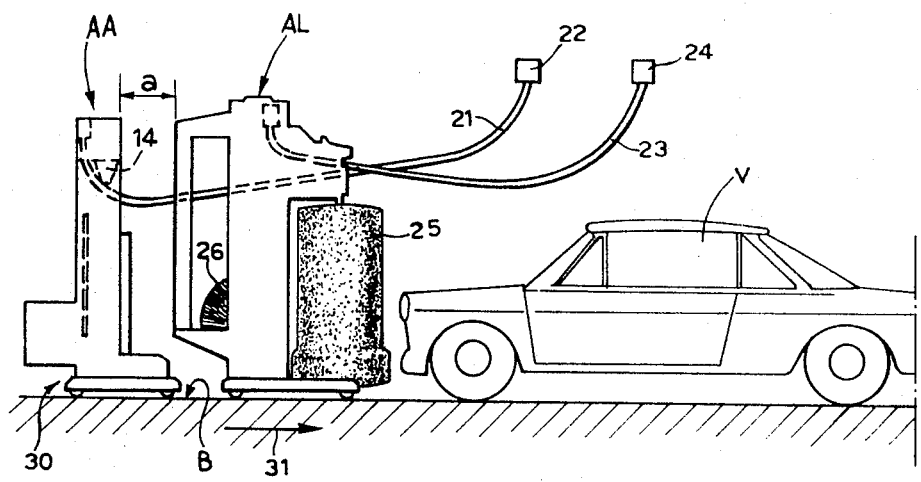

At the end of the forward movement of the two units the washing unit AL and the drying unit AA are in the positions shown in FIG. 4: the drying unit AA is located with its supporting carriages 4, 5 in proximity to rear limit stops 30 and is still spaced by the distance a from the washing unit AL.

The washing unit AL now begins its return movement in the direction of arrow 31, its brushes 25, 26 rotating and its nozzles delivering rinsing water and a liquid mixture for wet polishing. The drying unit AA remains stationary for a waiting period during which its fans 9, 10 are operated and supply air to the lateral outlet slots 13 and the horizontal outlet slot 14, the latter being during this time in its uppermost position.

Figure 5:
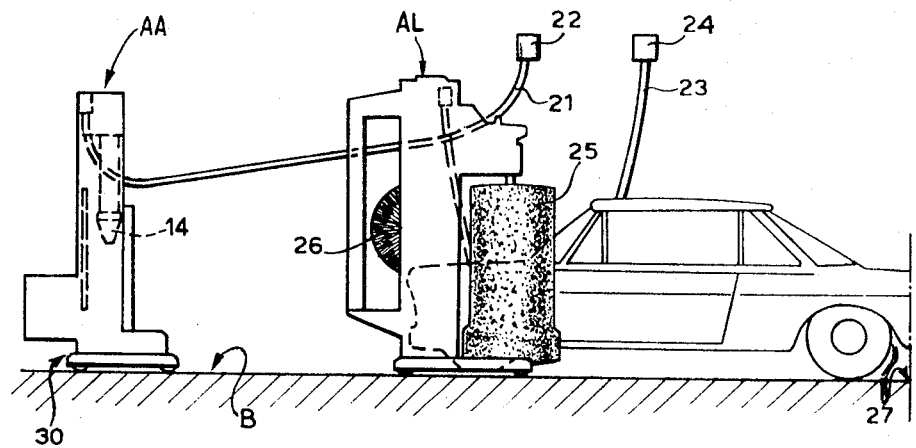

Return movement of the drying unit AA in the direction of arrow 31 is started after the washing arc AL has moved about 2—3 meters in this direction (FIG. 5). As the return movement of the drying unit AA starts, its horizontal outlet slot 14 is moved into its lowermost position, further vertical displacement of the slot 14 being then under the automatic control of its control unit.

The washing unit AL and drying unit AA now move together in the direction of arrow 31, being spaced apart by about 2—3 meters, and travel at the same speed in this direction, so that this spacing is maintained during the return movement (FIG. 6). While the washing unit AL completes the cleaning and wet polishing of the surfaces of the vehicle body V, the drying unit AA blows air jets against those surface regions from which a substantial quantity of the washing and rinsing water has flowed. The horizontal outlet slot 14 of the drying unit AA is displaced vertically during this return movement to follow the profile of the upper surface of the vehicle body V, under automatic control in response to the movements of the electromechanical feeler 18.

Upon completion of the return movement the washing unit AL first reaches the limit stop 27, whereupon its vertical brushes 25 are drawn apart and its horizontal brush 26 raised to its uppermost position in readiness for the start of a further cycle.

The operation of the drying unit AA is controlled during its forward and return movement from the same control console Q as that from which the washing unit AL is controlled. From the control console Q manual control of the movement of the two units (viz: starting, stopping and emergency-stopping) and control of the operation of the units (for example, operation of the fans 9, 10) is effected.

Figure 8:
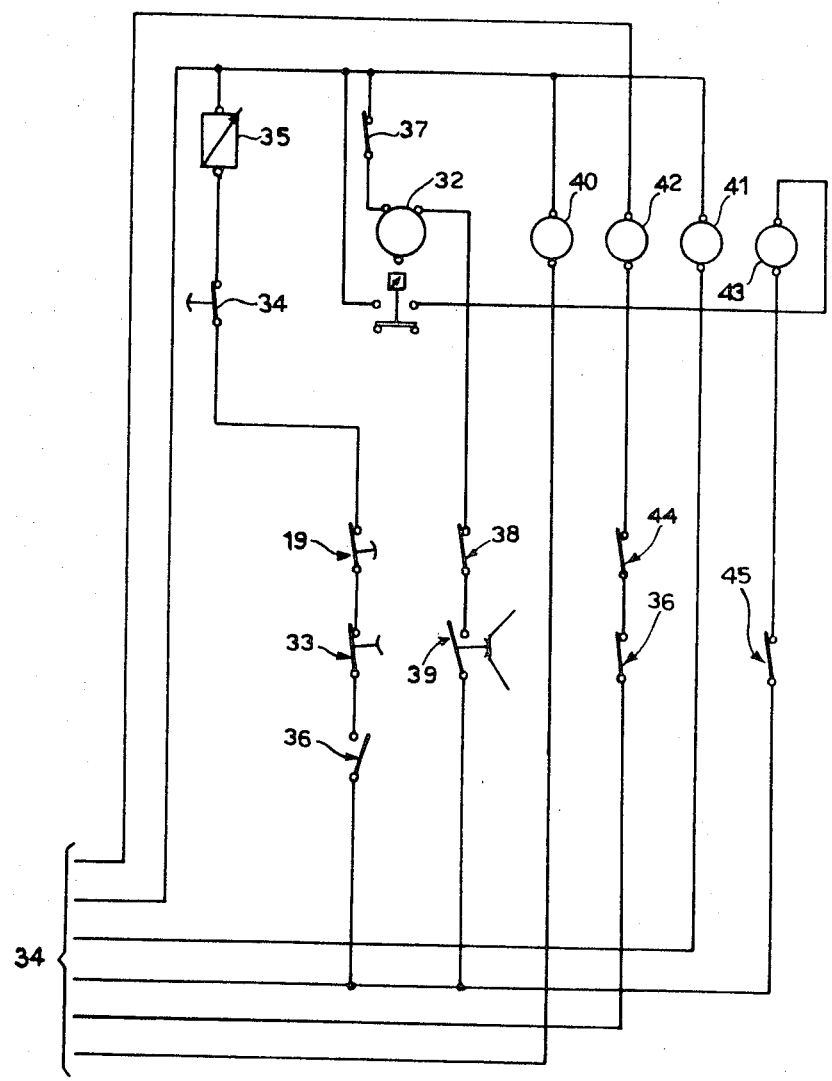
FIG. 8 is a diagram showing part of the electrical circuit of the plant controlling the operation of the drying unit of said plant.

The waiting period during which the drying unit AA remains stationary having completed its forward movement is timed by a delay switch included in an electric control circuit described hereafter with reference to FIG. 8. This waiting period is adjusted so as to allow the rinsing water to fully remove the detergent which has previously been sprayed on to the surface of the vehicle body V and to allow this rinsing water to flow away from the surface of the vehicle body V.

The downward and/or upward movement of the horizontal outlet slot 14 in the drying unit AA is normally effected by remote control from the electrical control console Q. However, the electromechanical feeler 18 controls this vertical movement through its associated switch 19 to cause the outlet slot 14 to follow the profile of the vehicle body V, independently of the control console Q, during the return or working movement of the drying unit AA. Moreover, during this working movement the automatic control of the vertical movement of the outlet slot 14 can if desired be overridden by means of a manual switch 33 in the control console Q, as hereinafter described with reference to FIG. 8.

The electric circuit controlling operation of the drying unit AA, shown in FIG. 8, comprises a set of six leads generally denoted by 34, connectable to the control console Q controlling operation of the washing unit AL. The circuit comprises, in addition to the above-mentioned delay switch 32, a pushbutton switch 33 and a switch 34 in series with a relay 35 associated with normally open contacts which control the supply of power to the servomotor for moving the outlet slot 14 vertically.

The circuit further includes contacts 36 for the remote control switch controlling the motor effecting return movement of the drying unit AA. Contacts 37 and 38 in series with the delay switch 32 are operated by auxiliary remote control switches and are connected in series with a return limit switch 39 for the drying unit AA. Auxiliary contact makers 40, 41 and 42, 43 control operation of the motors for effecting movement of the drying unit AA during its forward and return movements respectively. Contacts 44 and 45 of an auxiliary remote control switch control operation of the motor which effects forward movement of the drying unit AA.

It will be understood that constructional details of embodiments of the invention may be widely varied with respect to that described and illustrated by way of example, without departing from the scope of the invention as defined in the appended claims.

Thus, for example, during the forward movement, the drying unit could be close to the washing unit and be moved by the latter, its own propelling motor being inoperative. The propelling motor of the drying unit would be started only at the beginning of the return movement of the latter, with a considerable economy in consumption of the electric power required for operating the plant.

The invention also comprehends a plant in which the drying unit is movable along the same track as the washing unit, the starting positions of the two units being, however, normally located near opposite ends of their common track. In this case the operation of the plant would start with a forward movement of the washing unit, the movement of the drying unit beginning after the washing unit has travelled over a certain length of its return movement towards its respective starting position.

In this case the operation of the fans on the drying unit, following the action of the washing unit on the surface of the vehicle body, may cease after the drying unit has reached a position in which it is close to the washing unit, the latter having reached its starting position on its return movement. However, operation of the fans on the drying unit and action of the latter may if desired be continued during the return movement of the drying unit to its respective starting position at the opposite end of the track with respect to the starting position of the washing unit.

What I claim is:

1. Washing and drying plant for motor vehicles, comprising: means defining an area for receiving a vehicle body to be cleaned; a common guide track comprising a pair of rails arranged on opposite sides of said area; a washing unit and a drying unit respectively movable along said guide track, and control means controlling movements of the washing and drying units along said track, and controlling the operation of said units to effect washing and drying respectively, in a predetermined sequence.

2. Plant as claimed in claim 1, in which the control means are effective to cause the drying unit to follow the movement of the washing unit during part at least of the movement of the latter, said control means including means starting operation of the drying unit automatically after the washing unit has traversed a certain length of the vehicle-receiving area.

3. Plant as claimed in claim 1, in which, in operation of the plant, the drying unit starts its movement from a position adjacent the washing unit.

4. Plant as claimed in claim 3, in which, in operation of the plant, the drying unit starts its forward movement towards the vehicle-receiving area slightly in advance of the movement of the washing unit.

5. Plant as claimed in claim 1 in which, in operation of the plant, the drying unit starts its movement from an end of the track opposite the end from which the movement of the washing unit starts.

6. Plant as claimed in claim 5, in which the control means causes the drying unit to be operative during its movement in the direction of the starting position of the washing unit, and its operation to be maintained during return movement of the drying unit in an opposite direction to its respective starting position.

7. Plant as claimed in claim 1, in which, in operation of the plant, the speed at which the drying unit follows the movement of the washing unit is such that the drying unit is constantly spaced from the washing unit during movement of the latter.

8. Plant as claimed in claim 7 in which, when the drying unit follows the washing unit during the return movement of the latter, the spacing of the units and their speeds are selected to cause most of the washing water from the washing unit to flow away from the surface of successive parts of the body of the vehicle undergoing washing before the drying unit acts thereon.

9. Plant as claimed in claim 1, in which the drying and washing units have respective propelling motors for driving them along said tracks.

10. Plant as claimed in claim 9, in which, during the forward movement of the drying unit, its respective propelling motor is inoperative, the drying unit being pushed by the washing unit and the propelling motor of the latter being operated exclusively during the reverse movement of the drying unit.